UNITED STATES PATENT OFFICE.

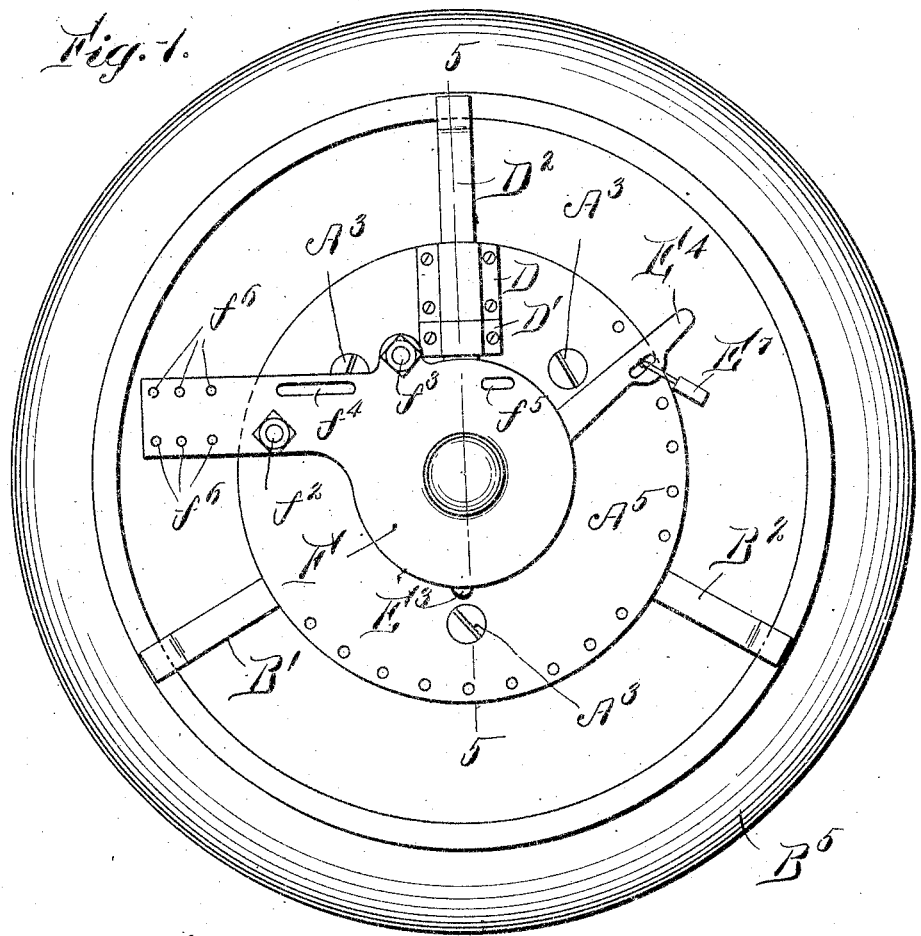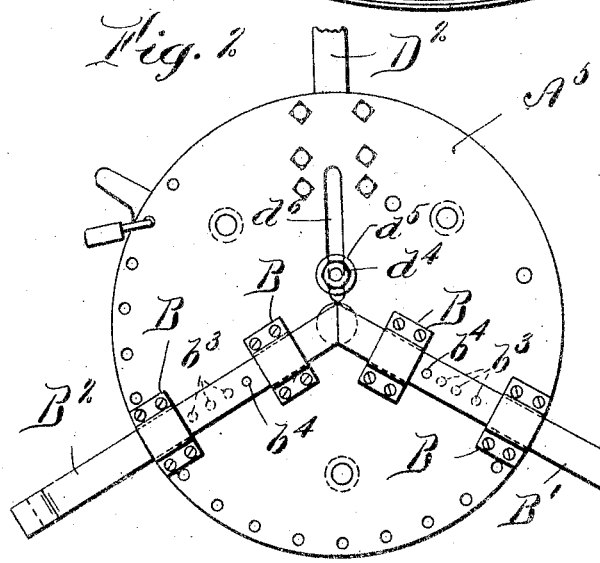

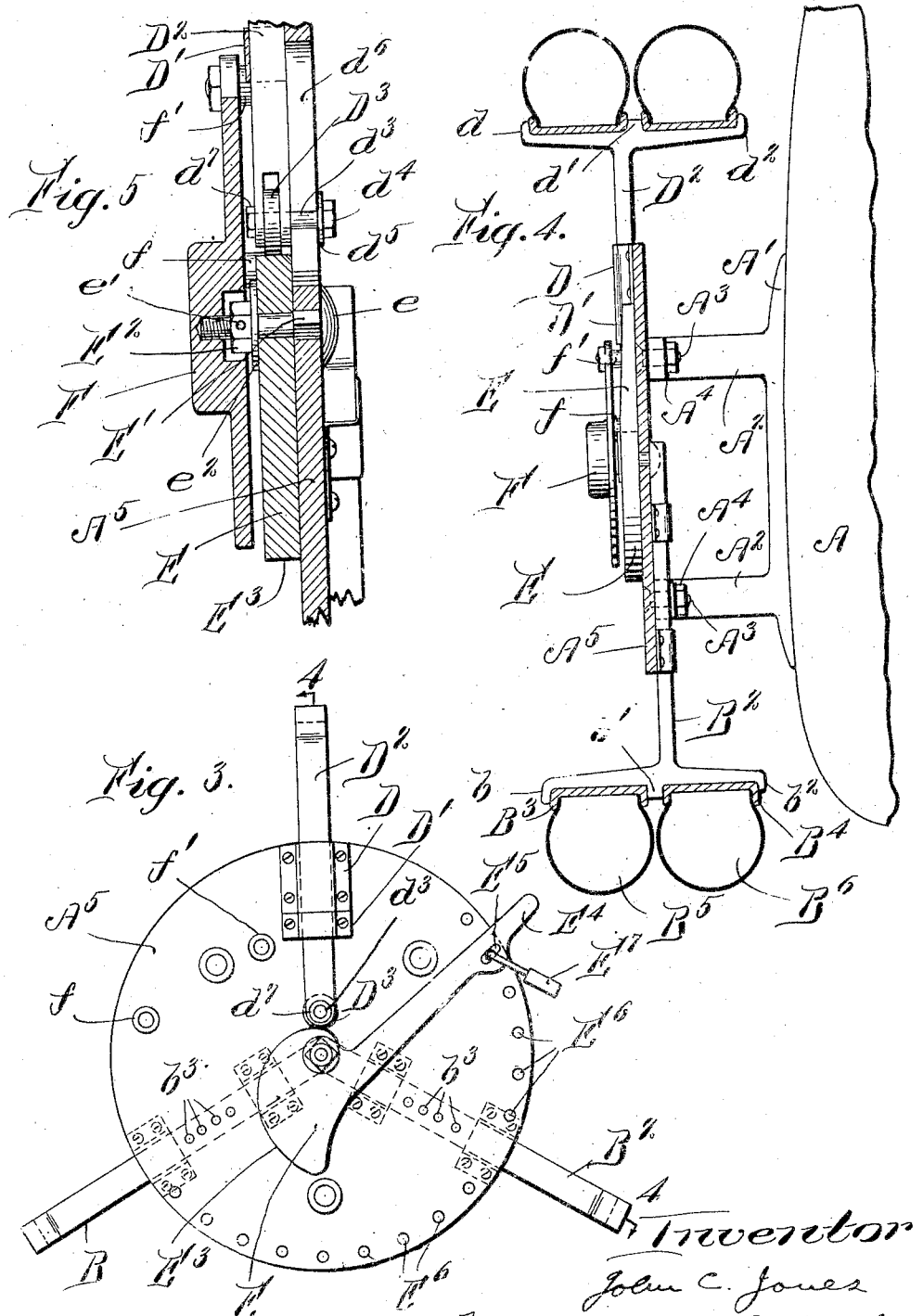

JOHN C. JONES, OF BROOKLINE, MASSACHUSETTS.

TIRE-HOLDER.

1,326,739. Specification of Letters Patent. Patented Dec. 30, 1919.

Applicaiton filed June 5, 1919. Serial No. 301,944.

*To all whom it may concern:*

Be it known that I, JOHN C. JONES, a citizen of the United States, and resident of Brookline, in the county of Norfolk and State of Massachusetts, have invented a new and useful Tire-Holder, of which the following is a specification.

The main object of my invention is to provide a device to lock a tire or tires against unauthorized removal from the holder.

A feature of my invention is means for moving a member into holding engagement with the tire, which term may include or exclude a rim on the tire, and for locking said member in such engagement so that theft or other unauthorized removal of the tire will be prevented and in the preferred form I provide a sliding engaging member operated by a rotary member which has a periphery gradually increasing in its distance from the axis, said periphery engaging a roller on the sliding member and the rotary member having a relatively large extension to form a handle, all the parts being relatively arranged to give a very large leverage in a very compact structure. I may if desired use two movable members to be moved by the rotary member. Another feature is a cover which prevents tampering with the movable elements and which acts not only to protect the parts but also may be used to carry a number plate and a rear light.

Other features will be pointed out below.

In the drawings

Figure 1 is a front elevation of a device embodying my invention showing a tire in place;

Fig. 2 is a rear elevation of said device;

Fig. 3 is a front elevation of said device, the cover being removed;

Fig. 4 is a side elevation of the device, partly in section on line 4—4 of Fig. 3; and Fig. 5 is an enlarged partial sectional detail on line 5—5 of Fig. 1.

To the body A of the automobile is suitably connected bracket A' having three integral supporting arms A² (two being shown), which are suitably connected by bolts A³ and nuts A⁴ to the disk A⁵ which forms the base of my device. Said bolts may be upset so as to prevent undesired removal.

To the rear of the disk I provide straps B to guide the arms B' B², each of which has at its outer end lugs $b$, $b'$ and $b^2$ being spaced to position two rims B³ and B⁴ connected to the shoes B⁵ and B⁶ and preventing transverse movement of the rims and shoes. When the desired adjustment of these arms is made they may be riveted to the disk or otherwise permanently connected so as to prevent unauthorized movement and for this purpose I provide a series of holes $b^3$ in the disk and holes $b^4$ in the arms in which rivets may be inserted when the arms have been adjusted. At their inner ends these arms are recessed on the faces toward the disk so as to make room for the bolt head hereinafter described when the arms are in their innermost position and in this position it would be unnecessary to use the holes $b^3$ and $b^4$ because the inner ends of the arms engage each other. The straps may be held to the disk by bolts and nuts, the former being upset to prevent unauthorized removal.

At the front of the disk are straps D and D' to guide arm D² which has lugs $d$, $d'$ and $d^2$ to hold the tires in spaced relation and prevent their transverse movement when the arm is in engagement with them. The strap D' may be removed if it is desired to give the arm D² a longer outward movement. The inner end of the arm D² is forked to receive roller D³ which turns on pivot bolt $d^3$, the latter having a head $d^4$ which engages washer $d^5$, the shank of the bolt passing freely through, but being guided by the slot $d^6$ in the disk, said shank extending also through the arm D² and through the roller D³ and having threaded engagement with nut $d^7$ so that arm D² is guided not only by said straps but is guided and reinforced by said slot and bolt, the latter having not only the function just referred to but serving also as the pivot of the roller. The shank of bolt $d^3$ may be upset if desired to prevent removal.

Rotary member E is pivoted to the disk by bolt E' whose head $e$ lies beneath the recesses in arms B' and B² when they are in the position shown in Fig. 3. Bolt E' is threaded and rectangular in cross section and carries nut E², and said bolt E' may be upset if desired to prevent removal and may be held by cotter pin $e'$, washer $e^2$ being inserted between the nut and member E. Bolt E' is in line with arm D² and I prefer this arrangement in order to get the most efficient leverage. Member $e$ has a periphery E³ gradually increasing in its distance from the axis and this periphery engages the roller D³ which, in the form shown, is a part of arm D² so that rotation of member E raises arm D² into engagement with the tire, handle E⁴ of member E being relatively long so as to provide very large leverage, said handle being perforated at E⁵, and said perforation being movable into registry with the desired perforation E⁶ of the disk, these perforations E⁶ being preferably near the periphery of the disk so that very slight adjustment of the arm D² may conveniently be taken care of. Padlock E⁷ passes through perforation E⁵ and the desired perforation E⁶ so as to lock the handle and thereby arm D² against movement. Cover F has a central threaded recess to engage the threading at the end of bolt E' and is also spaced from the disk by sleeves $f$ $f'$, bolts $f^2$ $f^3$ passing through the sleeves and being upset to hold the cover against undesired removal, the cover being thus held at three points all of which are out of the path of member E so that the latter may rotate freely between the disk and cover. I provide slits $f^4$ and $f^5$ in the cover which may be used for the attachment of a number plate and I also provide perforations $f^6$ which may be used for rear light connections.

In using my device the arms B' and B² may be adjusted for the desired size of tire and then locked against undesired removal as above described. The tire is then placed in position and the arm D² raised by turning handle E, my arrangement and my particular form of periphery E³ giving very great power. When arm D² has been raised sufficiently it is locked to the edge of the disk, the padlock being shown as locked to the second perforation E⁶ from the top but of course the padlock will be moved to engage with that perforation which gives the desired adjustment. the arm D² being adjustable not only for greater or less clamping effect with a given tire but also to hold tires of different sizes.

Among the advantages of my device I may point out its compactness, its simplicity and its efficiency not only in operation but also in preventing theft, or other undesired removal of the tire or tires.

While I prefer for various reasons to use a cover I might dispense with it and in that case unauthorized removal of the arm D² would be prevented by the rotary member and unauthorized removal of the latter by upsetting the bolt E'.

I prefer to have the outer face of the disk and cover painted with aluminum paint so as to be clearly visible at night adding an element of safety against cars approaching from the rear.

What I claim is:

1. A tire or rim carrier, comprising a radially movable member to engage the tire or rim, and a rotary member arranged near the inner end of the radially movable member and having a cam periphery to engage said inner end to shift the member outwardly, said rotary member having the starting portion of its periphery arranged at substantially a right angle to the direction of movement of the radially movable member when the rotary member is in the starting position, whereby said starting portion of the periphery will engage with the inner end of the radially movable member and retain the rotary member in the starting position.

2. A tire or rim carrier, comprising a radially movable member to engage the tire or rim, a rotary member arranged near the inner end of the radially movable member and having a cam periphery to engage said inner end to shift the first named member outwardly, a lever carried by the rotary member to turn it, said rotary member having the starting portion of its periphery arranged at substantially a right angle to the direction of movement of the radially movable member when the lever is shifted to the starting position substantially parallel with the radially movable member, whereby the starting portion of said periphery will engage with the inner end of the radially movable member and retain the lever in the starting substantially parallel position.

3. A tire or rim carrier, comprising a substantially vertical radially movable member to engage the tire or rim, a rotary member arranged near and beneath the inner end of the radially movable member, a lever carried by the rotary member and adapted to be shifted to a substantially vertical starting position, said rotary member having a cam periphery to engage the inner end of the radially movable member, the inner portion of said cam periphery being approximately horizontal when the lever is in the substantially vertical position, and means to lock the lever against movement in the desired adjusted position.

4. A tire or rim carrier, comprising a radially movable member to engage the tire or rim, a rotary member arranged near the inner end of the first named member, a lever carried by the rotary member, said rotary member having a cam periphery, said cam periphery being provided with a depression near its starting end, to receive the inner end of the radially movable member for locking the rotary member against turning movement, and separate means to lock the lever against swinging movement.

5. A tire or rim carrier, comprising a generally radially extending lever, a disk arranged upon one side of the lever in a plane substantially parallel to the plane of movement of the lever, said disk having its periphery terminating near the outer end of the lever, such outer end being adapted to be moved for a substantial distance in proximity to said periphery, adjustable means to lock the outer end of the lever with the disk near its periphery, a rotary member pivoted to the central portion of the disk and having an exterior cam periphery, said member being connected with the lever, a radially movable member secured to the disk and having its inner end arranged for engagement with the cam periphery, and means for connecting the disk with the automobile.

6. A tire or rim carrier, comprising a supporting disk, said disk provided near its periphery with a series of apertures, a radially movable member carried by the disk and adapted to engage with the tire or rim, a rotary member pivoted to the disk near the inner end of the radially movable member and provided with a cam periphery to engage such inner end, a lever carried by the rotary member and having its outer end extending near the periphery of the disk and apertures, and a lock having a portion adapted for insertion through the aperture of the lever and to be passed through a selected aperture in the disk.

7. A tire or rim carrier, comprising a generally radially extending lever, a disk arranged upon one side of the lever in a plane substantially parallel to the plane of movement of the lever, said disk having its periphery terminating near the outer end of the lever, such outer end being adapted to be moved for a substantial distance, in proximity to said periphery, adjustable means to lock the outer end of the lever with the disk near its periphery, a rotary member pivoted to the central portion of the disk upon one side of the disk and having an exterior cam periphery, said member being connected with the lever, a radially adjustable arm mounted upon the same side of the disk with the rotary member, a plurality of radial arms arranged upon the opposite side of the disk and secured thereto, and means for connecting the disk with the automobile.

8. A tire or rim carrier, comprising a supporting disk, a radially adjustable member arranged upon one side of the disk and carried thereby, a rotary member disposed on the same side of the disk to actuate the first named member, a lever connected with the rotary member to turn it, a bolt passing through the disk and pivotally supporting the rotary member and carrying a nut, a cover member covering the end of the bolt and nut and secured to the disk in spaced relation to permit of the passage of the lever between it and the disk, and means to hold the lever against movement.

9. A tire or rim carrier, comprising a disk provided near its center with an aperture, a radially adjustable arm slidably mounted upon one side of the disk, a bolt passing through the aperture in the disk and having its head disposed upon the opposite side of the disk, a plurality of radial arms secured to the said opposite side of the disk and having their inner ends arranged to cover the head of the bolt, a rotary member pivoted upon the free end of the bolt to operate the adjustable arm, a nut carried by the free end of the bolt to hold the rotary member against movement, a cover member secured to the disk in spaced relation and serving to house the nut and free end of the bolt, and a lever connected with the rotary member and arranged between the cover member and the disk.

10. A tire or rim carrier, comprising a supporting disk, a radially adjustable member arranged upon one side of the disk and carried thereby, a rotary member disposed on the same side of the disk to actuate the first named member, a lever connected with the rotary member to turn it, a bolt passing through the disk and pivotally supporting the rotary member and carrying a nut, a cover member covering the end of the bolt and nut and supporting said end of the bolt and secured to the disk in spaced relation to permit of the passage of the lever between it and the disk, and means to hold the lever against movement.

JOHN C. JONES.